(12) United States Patent
Shen

(10) Patent No.: US 6,872,306 B2
(45) Date of Patent: Mar. 29, 2005

(54) MULTIFUNCTIONAL PURE WATER MAKER

(76) Inventor: Albert Shen, 8F, No. 207-11, Sec. 2, Nan-Tun Road, Taichung City (TW)

( * ) Notice: Subject to any disclaimer, the term of this patent is extended or adjusted under 35 U.S.C. 154(b) by 141 days.

(21) Appl. No.: 10/419,836

(22) Filed: Apr. 22, 2003

(65) Prior Publication Data

US 2004/0211713 A1 Oct. 28, 2004

(51) Int. Cl.$^7$ .............................................. B01D 63/00
(52) U.S. Cl. .............................. 210/257.2; 210/321.65; 210/134; 210/260; 210/109; 210/195.1; 210/418; 222/56; 222/189.06
(58) Field of Search .......................... 210/257.2, 257.1, 210/321.65, 260, 416.1, 435, 282, 287, 295, 100, 86, 104, 113, 195.1, 91, 196, 110, 650, 652, 134, 109, 418; 222/55, 56, 189.06

(56) References Cited

U.S. PATENT DOCUMENTS 5,929,503 A * 7/1999 Beasom ...................... 257/497
6,080,313 A * 6/2000 Kelada ........................ 210/631
6,099,735 A * 8/2000 Kelada ........................ 210/652
2002/0060177 A1 * 5/2002 Conrad ........................ 210/203

* cited by examiner

Primary Examiner—W. L. Walker
Assistant Examiner—Krishnan S Menon
(74) Attorney, Agent, or Firm—Rosenberg, Klein & Lee

(57) ABSTRACT

A multifunctional pure water maker includes a main body and a reverse osmosis module. The main body includes a base portion and a column extending from the base portion. A water container is removably placed on the base portion. A control cap is pivotally attached to the column and includes a compartment in an underside thereof. An outlet pipe is mounted in the control cap and has an end communicated with the reverse osmosis module. Water purified by the reverse osmosis module flows through the other end of the outlet pipe into the water container when the control cap is in a closed position covering an opening of the water container. A limit switch is mounted in the control cap such that the reverse osmosis module is activated to proceed with production of pure water when the control cap is moved to the closed position and that the reverse osmosis module is deactivated when the control cap is moved to an open position.

9 Claims, 6 Drawing Sheets

MULTIFUNCTIONAL PURE WATER MAKER

BACKGROUND OF THE INVENTION

1. Field of the Invention

The present invention relates to a multifunctional pure water maker.

2. Description of the Related Art

Disinfecting water by boiling is gradually replaced by water filtering and purifying devices such as water purifying devices for removing chlorine and reverse osmosis drinking machines.

FIG. 1 of the drawings illustrates a conventional reverse osmosis pure water maker 1, in which water enters via an inlet pipe 11 and passes through a filtering module 12 and a reverse osmosis membrane 13. Next, the water passes through a filter 14 before it is dispensed. Alternatively, the water is stored in a water container 15 for future drinking. However, the water container 15 is generally an integral part of the pure water maker 1. Thus, the amount of drinkable water depends on the amount of water remained in the water container 15. The amount of pure water made by the pure water maker 1 is limited by the volume of the water container 15 unless additional pipeline is provided for connecting with additional water containers. Further, cleaning of the water container 15 is not easy, as the water container 15 is isolated.

SUMMARY OF THE INVENTION

An object of the present invention is to provide a multifunctional pure water maker that reduces inconvenience to storage of water and that allows easy cleaning of the water container.

Another object of the present invention is to provide a multifunctional pure water maker that allows easy replacement and maintenance.

A multifunctional pure water maker includes a main body and a reverse osmosis module. The main body includes a base portion and a column extending from the base portion. A water container is removably placed on the base portion. A control cap is pivotally attached to the column and includes a compartment in an underside thereof. An outlet pipe is mounted in the control cap and has an end communicated with the reverse osmosis module. Water purified by the reverse osmosis module flows through the other end of the outlet pipe into the water container when the control cap is in a closed position covering an opening of the water container. A limit switch is mounted in the control cap such that the reverse osmosis module is activated to proceed with production of pure water when the control cap is moved to the closed position and that the reverse osmosis module is deactivated when the control cap is moved to an open position.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
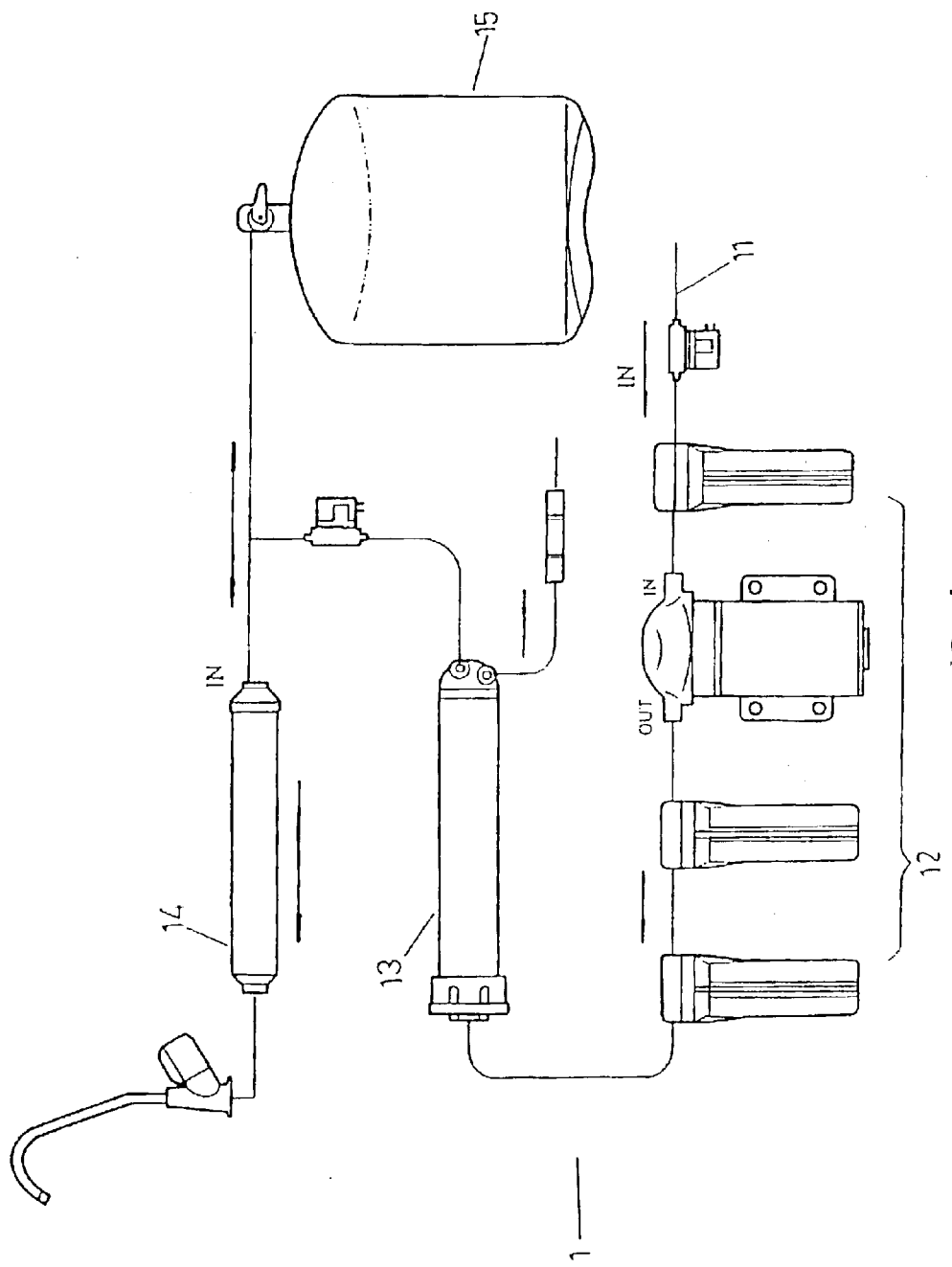
FIG. 1 is a schematic diagram illustrating operation of a conventional pure water maker.
Figure 2:
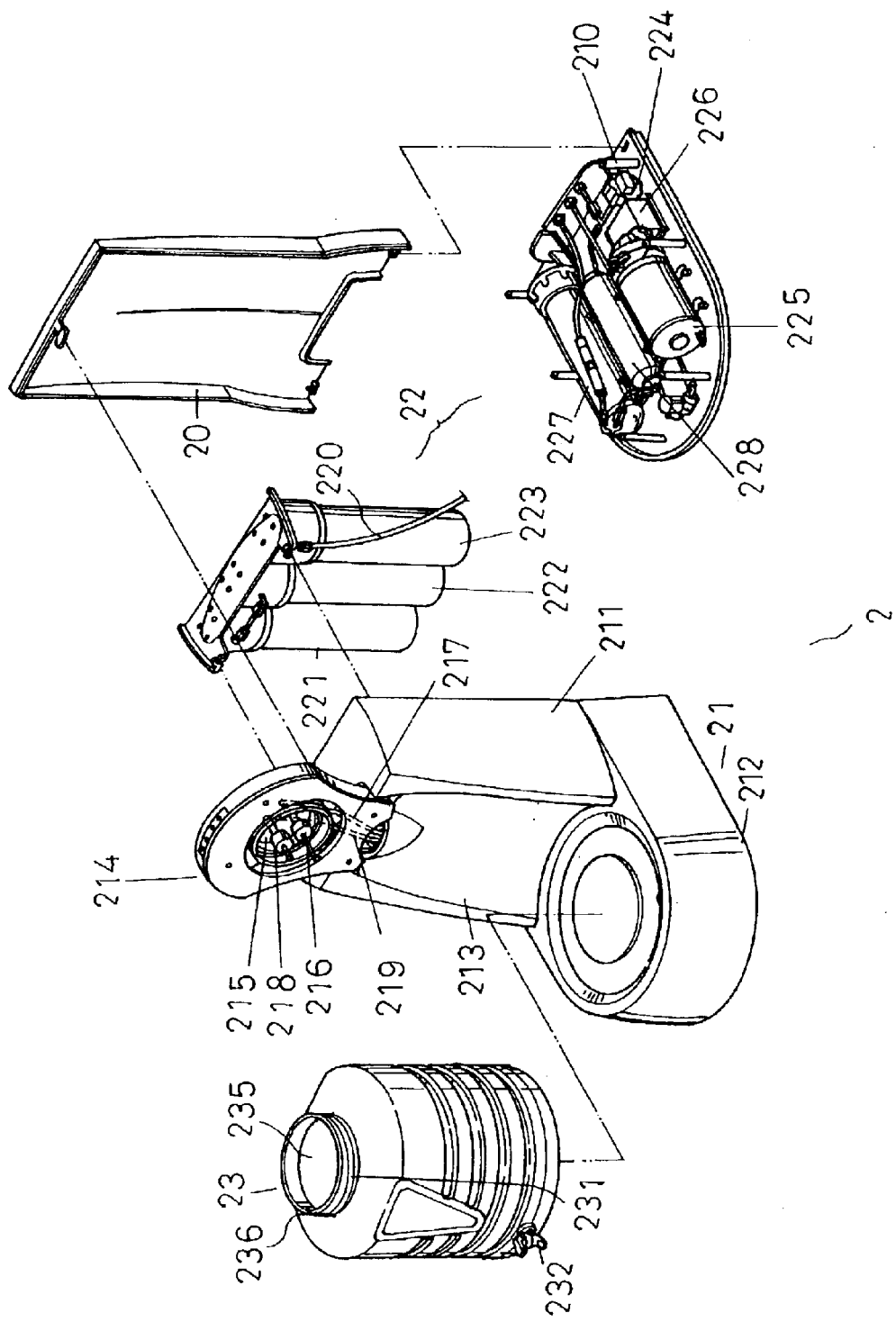
FIG. 2 is an exploded perspective view of a pure water maker in accordance with the present invention.
Figure 3:
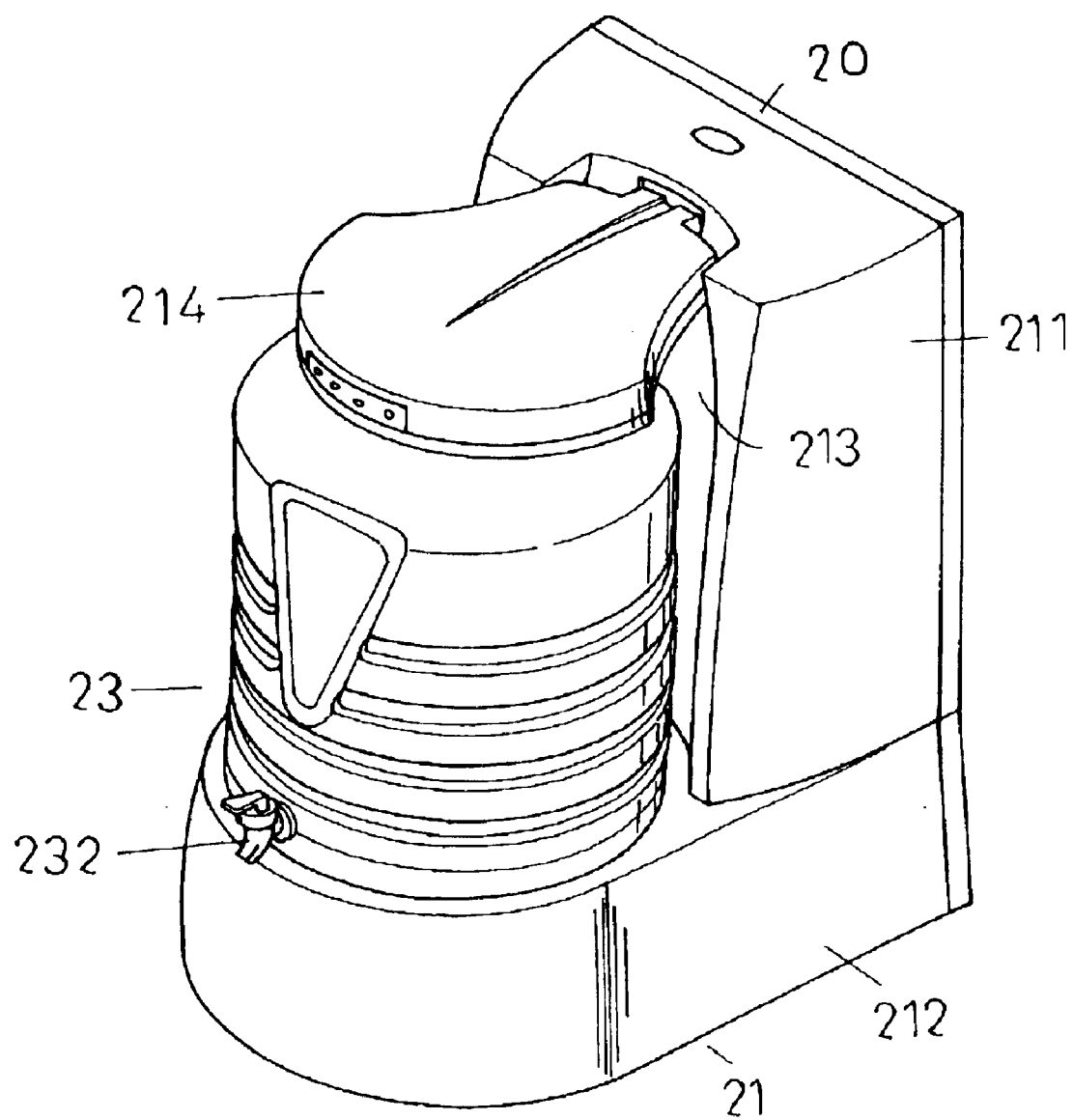
FIG. 3 is a perspective view of the pure water maker in accordance with the present invention.

Referring to FIGS. 2 and 3, a multifunctional pure water maker 2 in accordance with the present invention generally comprises a main body 21 having a base portion 212 and a column 211 extending upright from the base portion 212. A water container 23 is removably placed on the base portion 212. The column 211 includes a recessed portion 213 in a front face thereof for reliably holding a portion of the water container 23. A control cap 214 is pivotally attached between two lateral edges of the recessed portion 213. When in a closed position, the control cap 214 lies in a horizontal plane. When moving to an open position, the control cap 214 is pivoted upward and outward through an angle greater than 90 degrees, thereby lowering the risk of inadvertent closing of the control cap 214. The control cap 214 includes a compartment 215. An O-ring 218 is mounted to an inner periphery defining the compartment 215 in an underside thereof. When the water container 23 is placed on the base portion 212, a neck 236 of the water container 23 is received in the compartment 215, and the O-ring 218 securely holds the neck 236 of the water container 23 and provides a sealing effect to prevent entrance of air.

The control cap 214 has an interior communicated with an outlet pipe 217 of a reverse osmosis module 22. When the control cap 214 covers an opening 235 defined by the neck 236 of the water container 23 placed on the base portion 212, an outer end of the outlet pipe 217 allows flowing of water in the outlet pipe 217 into the water container 23.

Figure 6:
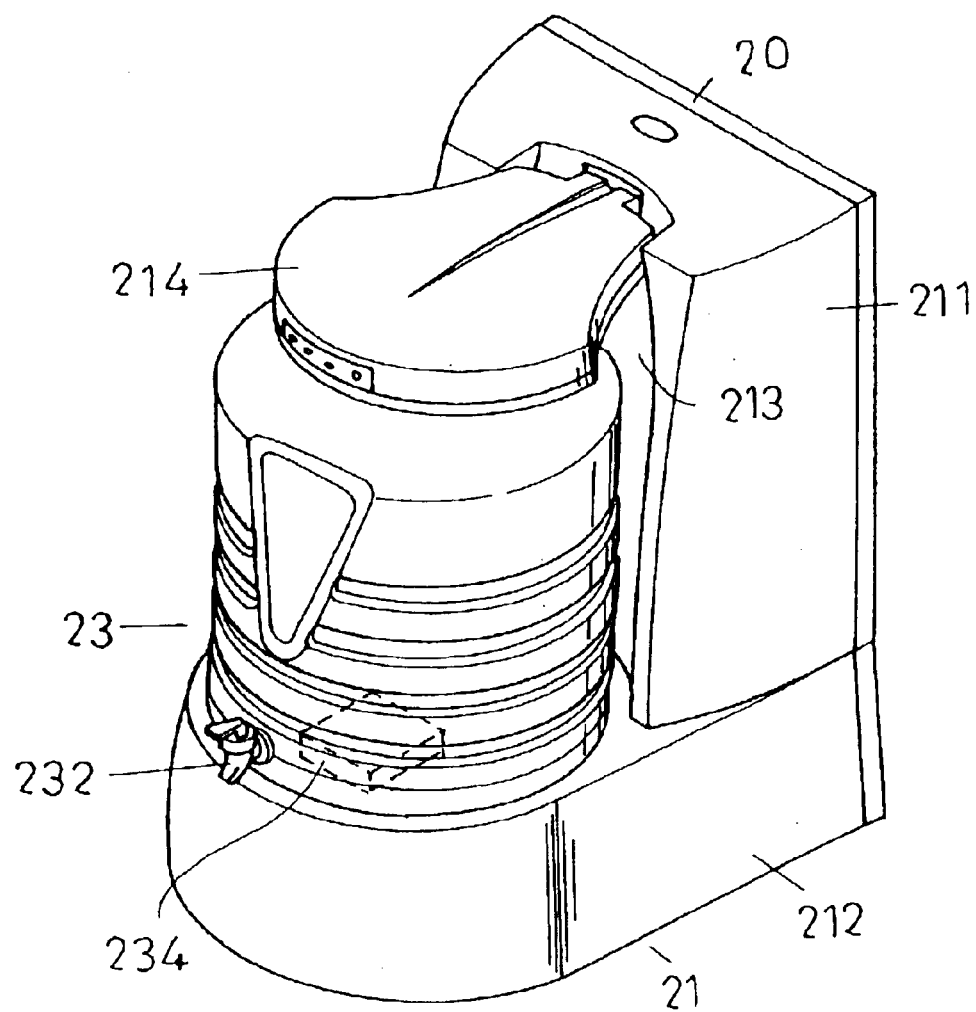
FIG. 6 is a perspective view illustrating another embodiment of the pure water maker in accordance with the present invention.

A level control means 216 extends from a bottom surface defining the compartment 215 of the control cap 214 for detecting the level of water in the water container 23. When the water in the water container 23 reaches a predetermined level (e.g., the water tank 23 is full), the pure water producing process and feeding of water into the water container 23 is terminated. In an alternative embodiment shown in FIG. 6, a weight control means 234 is mounted in the base portion 212. When the weight of the water container 23 reaches a predetermined value, the pure water producing process and feeding of water into the water container 23 is terminated.

The control cap 214 further includes an overflow pipe 219 connected to the reverse osmosis module 22. The overflow pipe 219 allows drainage of water out of the pure water maker 2 when overflow occurs or when the level control means 216 or the weight control means 234 malfunctions. A limit switch (not shown) is mounted in the control cap 214. When the control cap 214 is in the closed position covering the opening 235 of the water container 23, the reverse osmosis module 22 is activated to proceed with production of pure water. When the control cap 214 is in the open position, feeding of water and production of pure water are terminated.

The reverse osmosis module 22 may include flexible piping to direct flowing of the water. The reverse osmosis module 22 may be constructed to match the main body 21 without limitation of any specific configuration. In this embodiment, the reverse osmosis module 22 includes a first filter 221, an active carbon type chloride remover 222, and a second filter 222, all of which are located vertically. A rear cover 20 is provided to shield the reverse osmosis module 22. Further, the base portion 212 may include an opening (not shown) in a side thereof, allowing insertion of a mounting plate 210. A reverse osmosis membrane assembly consisting of a water cut-off control 224, a pressure pump 225, a transformer 226, a reverse osmosis membrane unit 227, and an active carbon means 228 is mounted on the mounting plate 210 that is removably received in the base portion 212, allowing easy installation, replacement, and maintenance.

In operation, water enters via an inlet pipe 220 and passes through the first filter 221 and the active carbon type chloride remover 222. Next, water passes through the second filter 223, the pressure pump 225, the reverse osmosis membrane unit 227, and the active carbon means 228, thereby purifying the water. The purified water may be subject to radiation by far-infrared rays.

Figure 4:
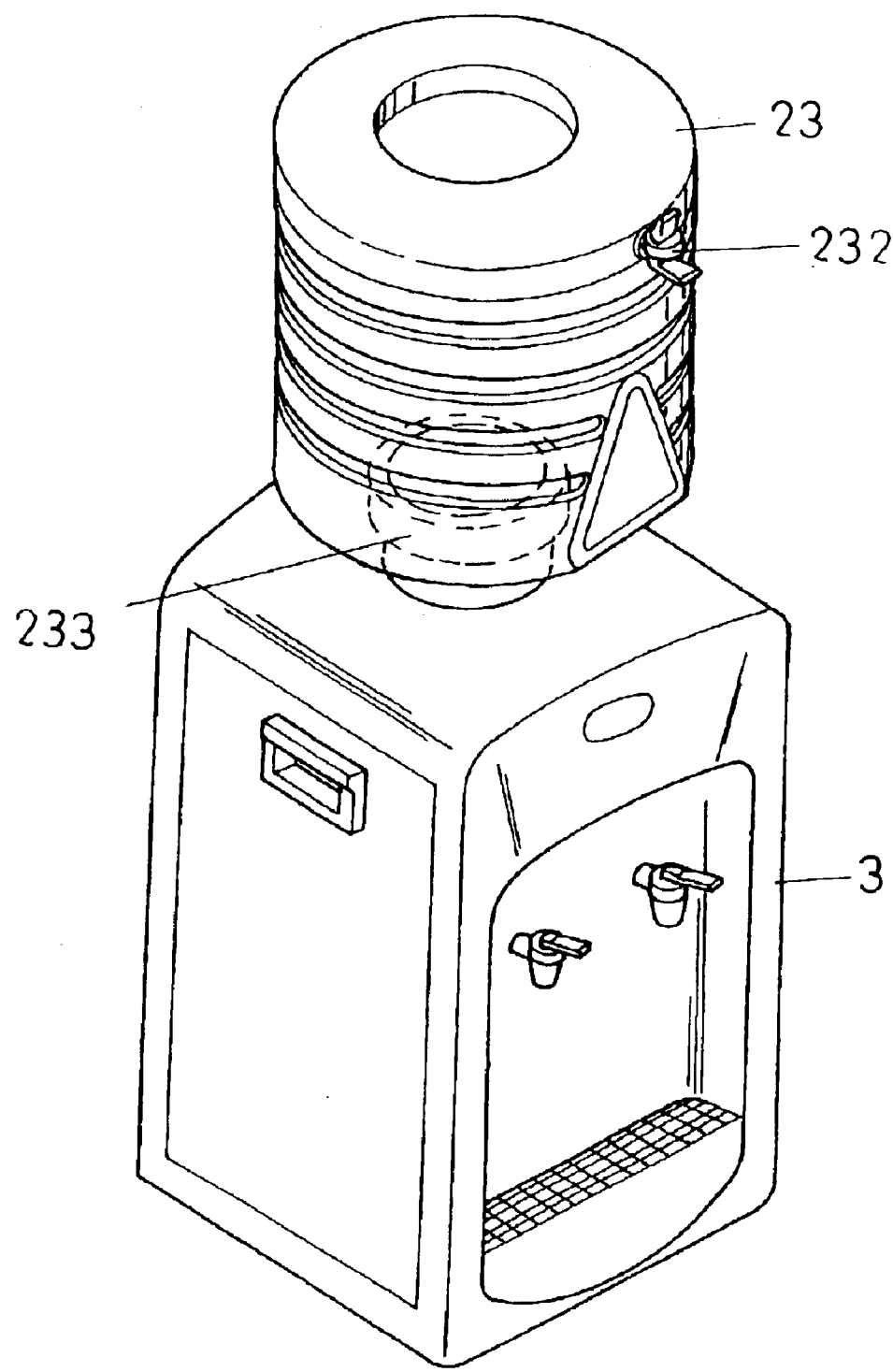
FIG. 4 is a perspective view illustrating another use of a water container of the pure water maker with a drinking machine.

After treatment, the drinkable water flows through the outlet pipe 217 and the compartment 215 of the control cap 214 into the water container 23. The water container 23 includes a faucet 232 for controlling dispense of water in the water container 23. The neck 236 of the water container 23 includes an outer threading 231. When the water container 23 is used with a drinking machine 3 shown in FIG. 4, the water container 23 is placed upside-down, with the outer threading 231 of the neck 236 of the water container 23 being engaged with an inner threading (not shown) of a portion 233 on the drinking machine 3.

Figure 5:
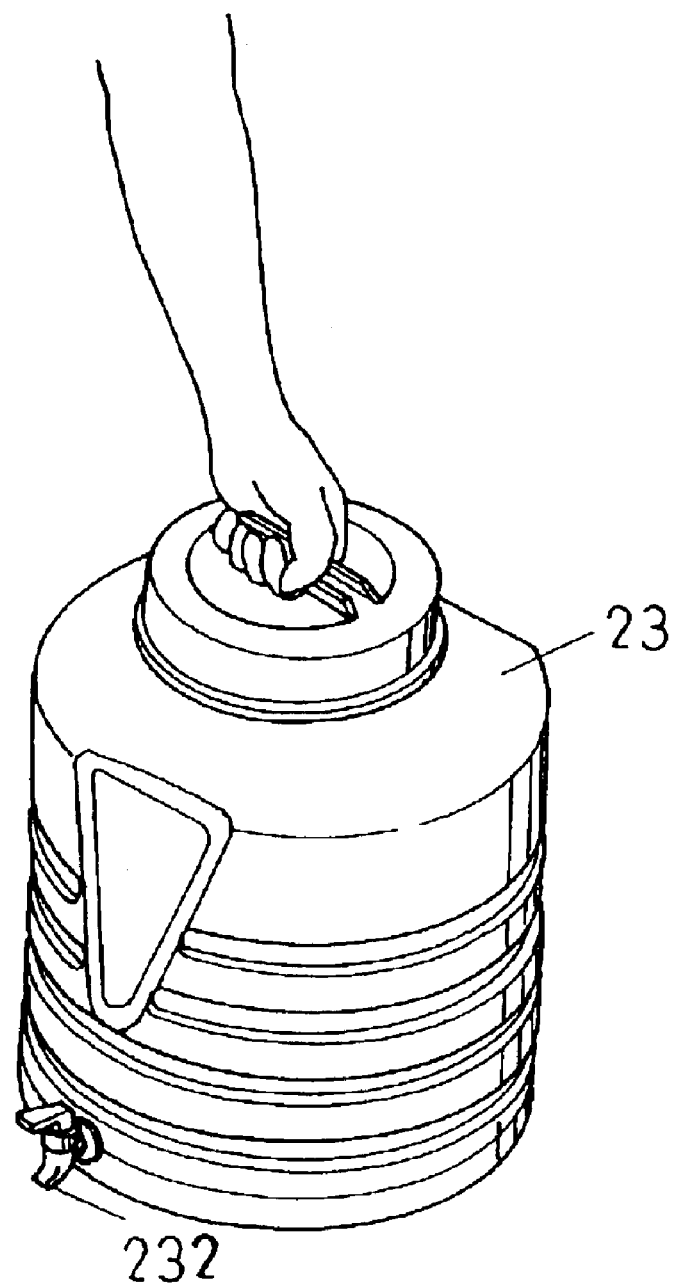
FIG. 5 is a schematic perspective view illustrating carriage of the water container of the pure water maker in accordance with the present invention.

In conclusion, the pure water maker 2 in accordance with the present invention has the following advantages:
1. The water container 23, when full, can be removed and replaced with an empty one.
2. The water container 23 can be carried easily, as shown in FIG. 5.
3. The limit switch in the control cap 214 allows automatic activation and termination of operation of the reverse osmosis module 22 as well as automatic starting and ending of water supply. Inconvenience and safety of operation are both improved.
4. When the weight of the water container 23 reaches a predetermined value or the water in the water container 23 reaches a predetermined level, the pure water producing process and feeding of water into the water container 23 are terminated.
5. In a case that the level control means 216 malfunctions, the overflow pipe 219 connected to the reverse osmosis module 22 allows proper drainage of the water.
6. The recessed portion 213 of the column 211 and the O-ring 218 in the control cap 214 securely hold the water container 23 in place.

Although the invention has been explained in relation to its preferred embodiments, it is to be understood that many other possible modifications and variations can be made without departing from the scope of the invention as hereinafter claimed.

What is claimed is:

1. A multifunctional pure water maker comprising a main body and a reverse osmosis module, the main body including a base portion and a column extending from the base portion, a water container being removably placed on the base portion, a control cap being pivotally attached to the column and including a compartment in an underside thereof, an outlet pipe being mounted in the control cap and having an end communicated with the reverse osmosis module, water purified by the reverse osmosis module flowing through the other end of the outlet pipe into the water container when the control cap is in a closed position covering an opening of the water container, a limit switch being mounted in the control cap such that the reverse osmosis module is activated to proceed with production of pure water when the control cap is moved to the closed position and that the reverse osmosis module is deactivated when the control cap is moved to an open position.

2. The multifunctional pure water maker as claimed in claim 1, wherein the base portion includes an opening in a side thereof, and wherein a mounting plate for mounting a reverse osmosis membrane assembly of the osmosis module is removably inserted into the base portion via the opening.

3. The multifunctional pure water maker as claimed in claim 2, wherein the mounting plate carries a filter, a water cut-off control, a pressure pump, a transformer, a reverse osmosis membrane unit, and an active carbon means.

4. The multifunctional pure water maker as claimed in claim 1, wherein the column includes a recessed portion for accommodating a portion of the water container.

5. The multifunctional pure water maker as claimed in claim 4, wherein the control cap is pivotally attached between two lateral edges of the recessed portion of the column.

6. The multifunctional pure water maker as claimed in claim 1, wherein the control cap further includes a level control means extending from a bottom surface defining the compartment of the control cap.

7. The multifunctional pure water maker as claimed in claim 1, wherein the control cap further includes an overflow pipe connected to the reverse osmosis module.

8. The multifunctional pure water maker as claimed in claim 1, wherein the control cap is pivoted from the closed position through an angle greater than 90 degrees to the open position, thereby preventing inadvertent closing of the control cap.

9. The multifunctional pure water maker as claimed in claim 1, wherein the base portion includes a weight control means, and wherein the pure water producing process and feeding of water into the water into the container are terminated when the weight of the water container reaches a predetermine value.

* * * * *